(12) United States Patent
Pelissero

(10) Patent No.: US 10,583,474 B2
(45) Date of Patent: Mar. 10, 2020

(54) MACHINE FOR WORKING RIBBON-SHAPED ELEMENTS

(71) Applicant: Byte Line Di Pelissero Alessandro, Treviglio (IT)

(72) Inventor: Alessandro Pelissero, Treviglio (IT)

(73) Assignee: Byte Line Di Pelissero Alessandro, Treviglio (IT)

( * ) Notice: Subject to any disclaimer, the term of this patent is extended or adjusted under 35 U.S.C. 154(b) by 897 days.

(21) Appl. No.: 14/888,575

(22) PCT Filed: Apr. 30, 2014

(86) PCT No.: PCT/IT2014/000118
§ 371 (c)(1),
(2) Date: Nov. 2, 2015

(87) PCT Pub. No.: WO2014/178089
PCT Pub. Date: Nov. 6, 2014

(65) Prior Publication Data
US 2016/0082494 A1 Mar. 24, 2016

(30) Foreign Application Priority Data

May 3, 2013 (IT) .............................. TO2013A0359

(51) Int. Cl.
*B21D 37/20* (2006.01)
*B21D 11/06* (2006.01)
(Continued)

(52) U.S. Cl.
CPC .............. *B21D 11/06* (2013.01); *B21D 9/125* (2013.01); *B21D 37/205* (2013.01);
(Continued)

(58) Field of Classification Search
CPC ...... B21D 9/125; B21D 11/06; B21D 37/205; B21D 43/006; B21D 53/64; B21C 37/121; B23P 15/00
(Continued)

(56) References Cited

U.S. PATENT DOCUMENTS

| 4,813,126 A | * | 3/1989 | Williamson | ............ B23P 15/00 29/605 |
| 5,036,690 A | * | 8/1991 | McGowen | ............ B21C 37/121 72/137 |
| 5,305,625 A | * | 4/1994 | Heinz | .................... B21D 9/125 72/129 |

FOREIGN PATENT DOCUMENTS

| JP | H11169955 A | 6/1999 |
| WO | 2000/61337 A1 | 10/2000 |
| WO | 2007/063376 A2 | 6/2007 |

* cited by examiner

*Primary Examiner* — David B Jones
(74) *Attorney, Agent, or Firm* — Burns & Levinson, LLP; John C. Serio

(57) ABSTRACT

A machine (1) for working a ribbon-shaped element (T1, T2', T2") is described, comprising at least one cutting station (2) crossed by the ribbon-shaped element (T1, T2', T2"), guiding means (3, 4) adapted to position and drag the ribbon-shaped element (T1, T2', T2") onto at least one fixed plane (PI) of the cutting station (2) keeping an edge of the ribbon-shaped element (T1, T2', T2") tangent to a fixed point (A1) of the fixed plane (Pi); at least one of the guiding means (3, 4) rests onto an arm (31) free of rotating with respect to a fixed axis (33); the fixed axis (33) is at the same distance with respect to the cutting station (2) and the at least one of the guiding means (3, 4).

8 Claims, 6 Drawing Sheets

(51) Int. Cl.
- *B26D 1/12* (2006.01)
- *B21D 53/64* (2006.01)
- *B21D 43/00* (2006.01)
- *B21D 9/12* (2006.01)
- B23P 15/00 (2006.01)
- B21C 37/12 (2006.01)

(52) U.S. Cl.
CPC ............ *B21D 43/006* (2013.01); *B21D 53/64* (2013.01); *B26D 1/12* (2013.01); *B21C 37/121* (2013.01); *B23P 15/00* (2013.01)

(58) Field of Classification Search
USPC .......................................................... 72/66
See application file for complete search history.

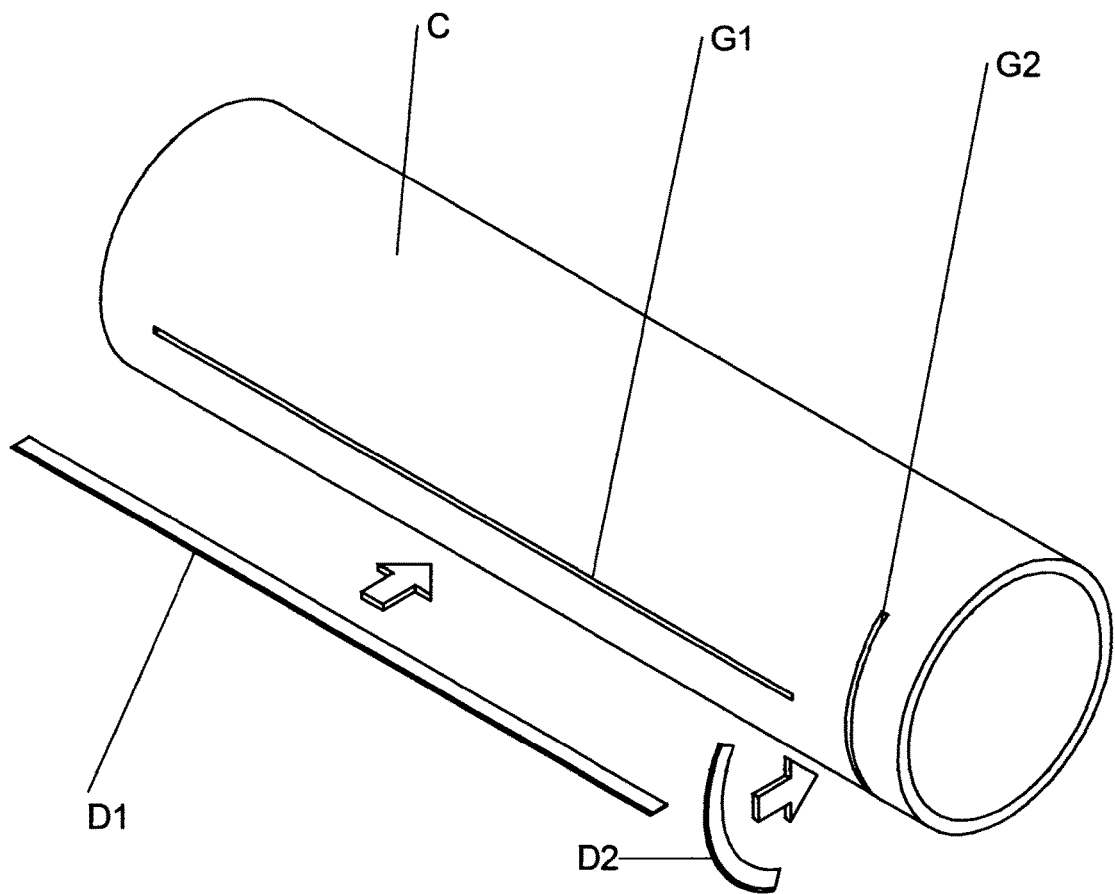
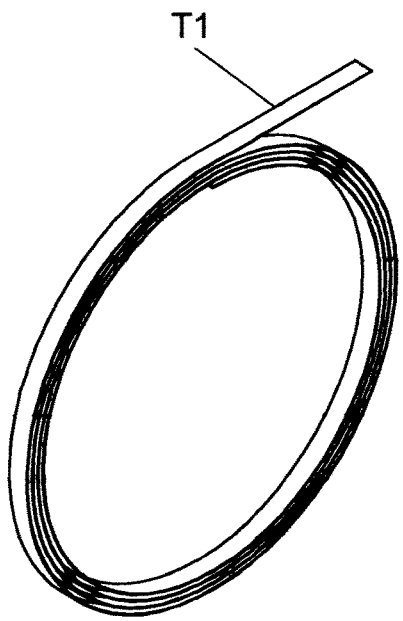
Fig. 2
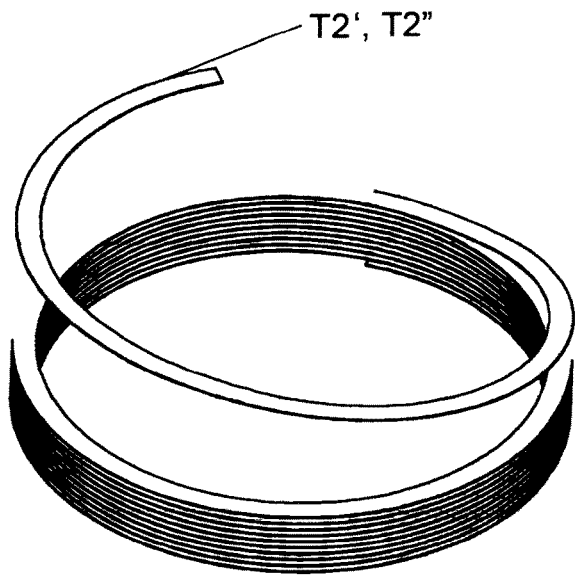
Fig. 3

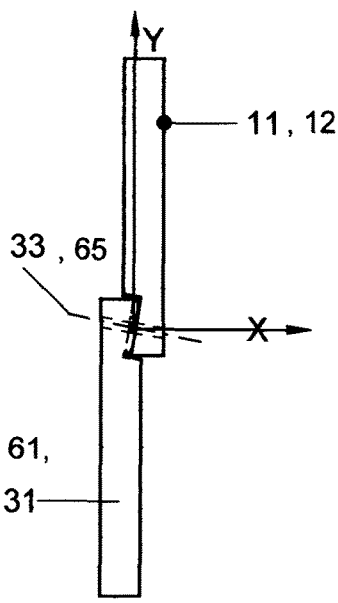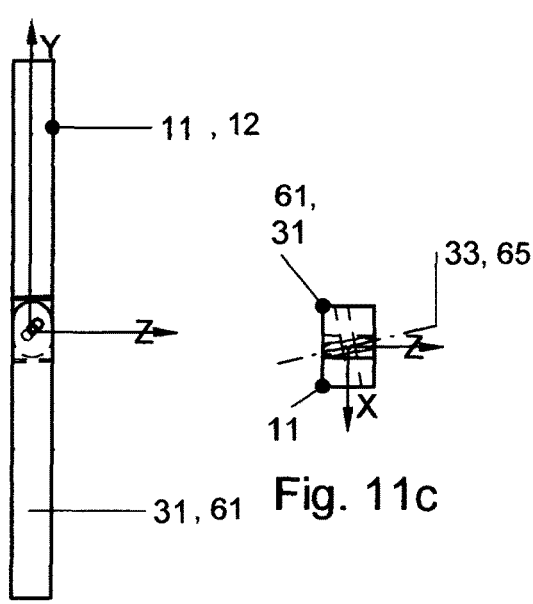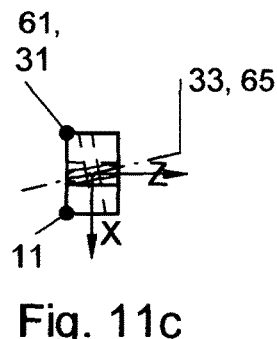
Fig. 11a  Fig. 11b  Fig. 11c
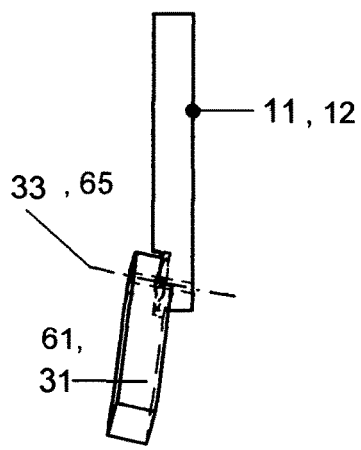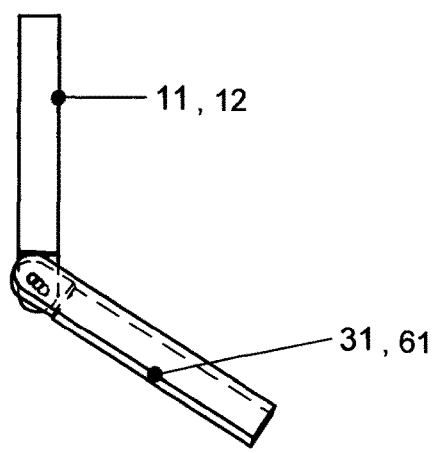
Fig. 12a  Fig. 12b
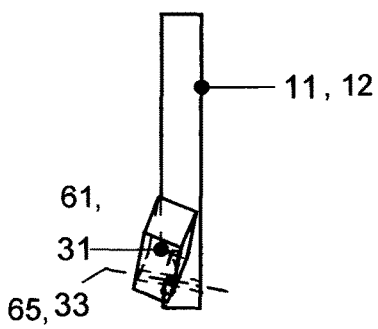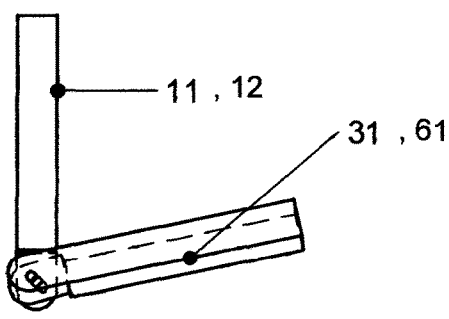
Fig. 13a  Fig. 13b

MACHINE FOR WORKING RIBBON-SHAPED ELEMENTS

CROSS-REFERENCE TO RELATED APPLICATIONS

This is a U.S. national phase application under 35 U.S.C. 371 of International Application No. PCT/IT2014/000118, entitled MACHINE FOR WORKING RIBBON-SHAPED ELEMENTS, filed on Apr. 30, 2014, which in turn claims priority to and benefit of Italian Patent Application No. TO2013A000359, filed on May 3, 2013, which is incorporated by reference herein in its entirety for all purposes.

BACKGROUND OF THE INVENTION

1) Field of the Invention

The present invention deals with a machine for working ribbon-shaped elements.

In particular, the invention deals with a machine for producing pads for rotary dinking dies used in the paper field, starting from rectilinear or curved steel ribbons, subjected to a series of workings by means of units arranged along rectilinear, helical or circular trajectories with different radiuses.

2) Background Art

As regards rotary dinking dies, suitably worked pieces of ribbon are applied onto cylinders, typically made of wood, inserted into suitable slits obtained on theft side surface. Each piece of ribbon, having rectilinear or curved shape, is inserted into its corresponding slit and arranged along the cylinder axis or along a slanted axis.

A typical machine for working ribbon crops to be inserted in dinking dies comprises a dragging apparatus and a series of ribbon working stations adapted to cut, bend, mark, etc.

The positioning of apparatuses and stations depends on the ribbon geometry to be subjected to the series of workings.

In the specific field of rotary dinking dies, the art of a machine for working ribbon-shaped elements was developed along two directions: a) machines arranged to operate limitedly and exclusively with a rotary ribbon with fixed radius, choosing every time the sizes which are more requested by users; b) machines arranged with multi-axle systems adapted to position the working devices along paths with variable, even rectilinear, radius.

The first solution for this problem is disclosed in WO2000061337.

The second solution for this problem is disclosed in WO2007063376.

SUMMARY OF THE INVENTION

In view of this prior art, object of the present invention is solving, on one end, the limits of embodiments with fixed radius, and on the other end, the complexity of multi-axle embodiments, by providing a machine equipped with a series of working apparatuses and stations placed along a circular trajectory with variable radius, even rectilinear, possibly complying with an helical angle to facilitate the fitting with the helical shape of a roll of curvilinear ribbon, by adjusting a single movement for every apparatus and station.

The above and other objects and advantages of the invention, as will appear from the following description, are obtained by a machine for working ribbon-shaped elements as claimed in claim 1. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) could be made to what is described, without departing from the scope of the invention, as appears from the enclosed claims.

BRIEF DESCRIPTION OF THE DRAWINGS

The present invention will be better described by some preferred embodiments thereof, provided as a non-limiting example, with reference to the enclosed drawings, in which:

FIG. 1 shows an axonometric view of a cylinder of a rotary dinking die in which sections of rectilinear and curvilinear ribbon must be inserted, which can be obtained with an embodiment of the machine for working ribbon-shaped elements according to the present invention;

FIG. 2 shows an axonometric view of a spirally wound rectilinear ribbon, from which the sections of rectilinear ribbon are obtained;

FIG. 3 shows an axonometric view of a helically wound curvilinear ribbon from which the sections of curvilinear ribbon are obtained;

FIGS. 11a, 11b, 11c show orthogonally projected views of a slanted joint in a configuration for rectilinear ribbon of an embodiment of the machine for working ribbon-shaped elements according to the present invention;

FIGS. 12a and 12b show orthogonally projected views of the slanted joint, in a first curvilinear configuration; and FIGS. 13a and 13b show orthogonally projected views of the slanted joint in a second curvilinear configuration.

DETAILED DESCRIPTION OF PREFERRED EMBODIMENTS

Figure 4:
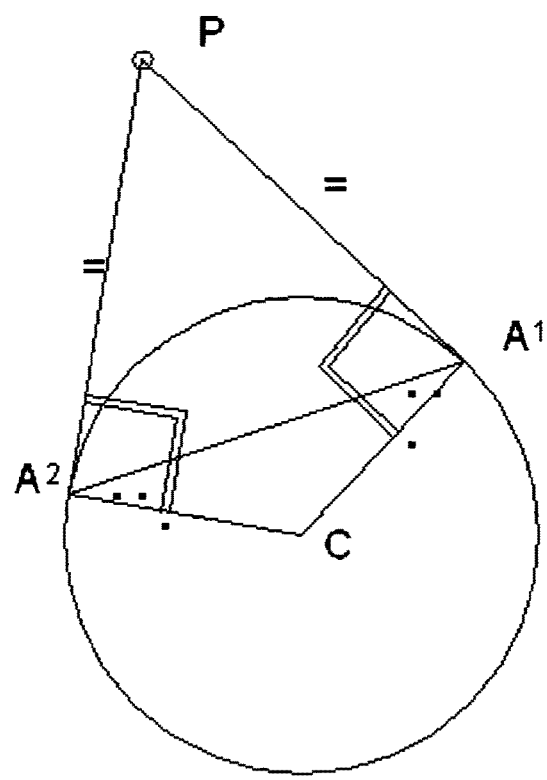
FIGS. 4 and 5 show geometric constructions which are the theoretical foundation for an embodiment of the machine for working ribbon-shaped elements according to the present invention.

With reference to FIGS. 1, 2, 3, a piece of rectilinear ribbon DI inserted into a slit GI parallel to the main axis of a cylinder C is obtained by working a spirally wound ribbon-shaped element TI.

A piece of curvilinear ribbon D2 inserted into a slit G2, slanted by a certain angle on the side surface of the cylinder C, is obtained by working a helically wound ribbon-shaped element T2', T2".

With reference to FIGS. 4 to 7, a machine 1 for working a ribbon-shaped element T1, T2', T2" comprises at least one cutting station 2 crossed by the ribbon-shaped element T1, T2', T2", guiding means 3, 4 adapted to position and drag the ribbon-shaped element T1, T2', T2" onto at least one fixed plane P1 of the cutting station 2, keeping an edge of the ribbon-shaped element T1, T2', T2" tangent to a fixed point A1 of the fixed plane P1.

Next to the cutting station 2, the helical trajectory of the ribbon-shaped element T2', T2" can be approximated as purely circular planar figure.

With this approximation, the ribbon-shaped element T1, T2', T2" rests on the fixed plane P1 and the possible edges traced by the ribbon-shaped element T1, T2', T2" remain tangent to the fixed point A1 of the fixed plane P1.

At least one of the guiding means 3, 4 rests on an arm 31 free of rotating with respect to a fixed axis 33.

The fixed axis 33 is at the same distance with respect to the cutting station 2 and at least one of the guiding means 3, 4.

The cutting station 2 comprises a pair of side guides 25, 26 arranged along a line coincident with or parallel with or very near a line 28 resting on the fixed plane P1 passing by the point A1 perpendicularly to the ribbon-shaped element T1, T2', T2".

At least one of the guiding means 3, 4 comprises contact elements 35, 36 adapted to guide and possibly drag the ribbon-shaped element T1, T2', T2". The contact elements 35, 36 are arranged along a line 55 resting on the fixed plane P1 perpendicularly to the ribbon-shaped element T1, T2', T2".

The fixed axis 33 is approximately perpendicular to the plane P1 and the distance between the fixed axis 33 and the line 28 coincides with the distance between the fixed axis 33 and the line 55.

Figure 5:
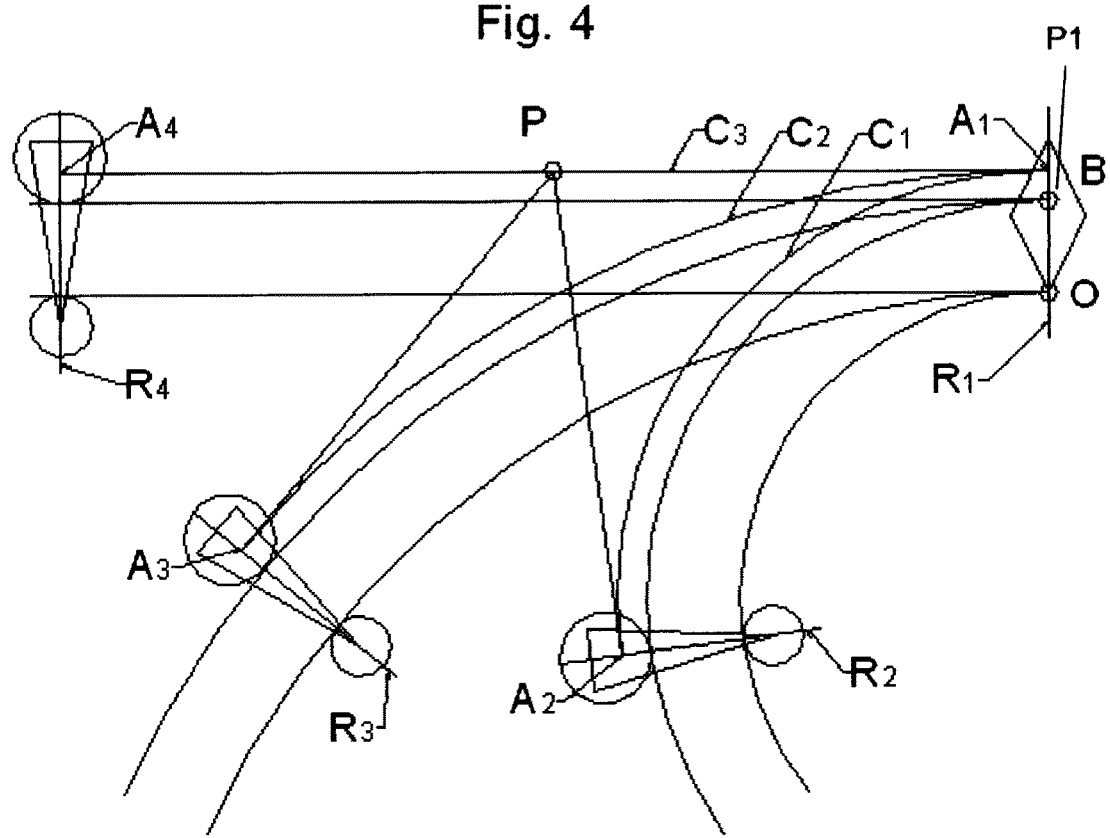
Figure 6:
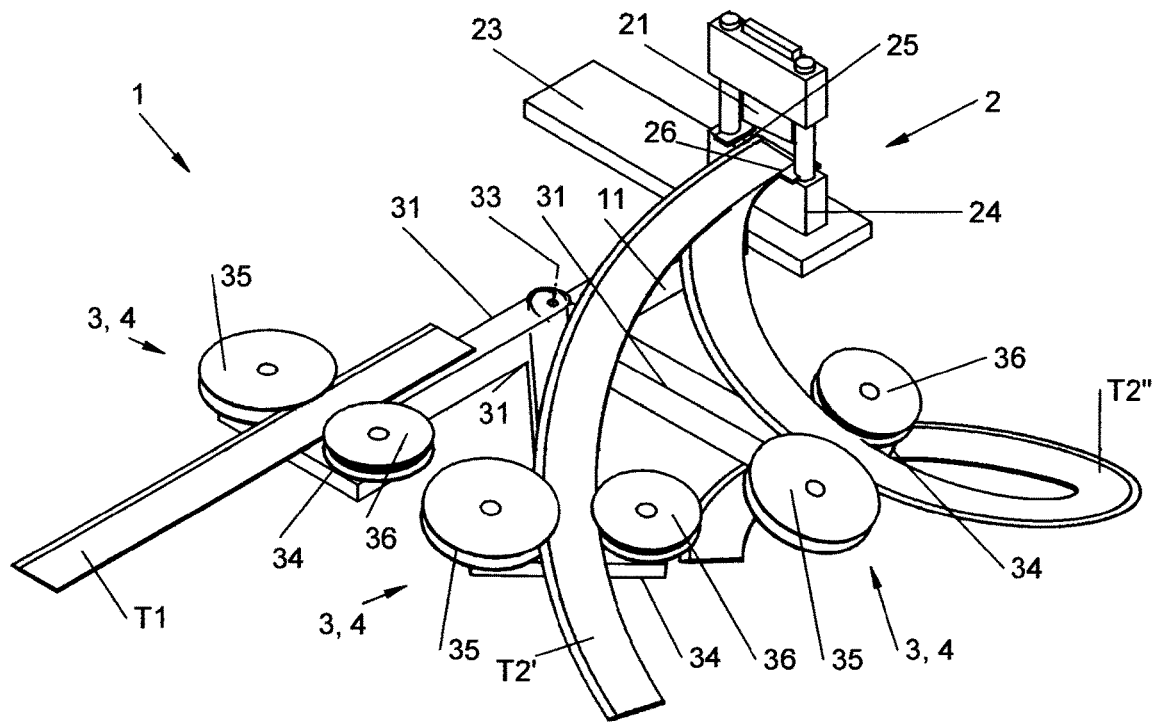
FIGS. 6 and 7 shows an axonometric view and a plan view of different configurations of an embodiment of the machine for working ribbon-shaped elements according to the present invention.
Figure 7:
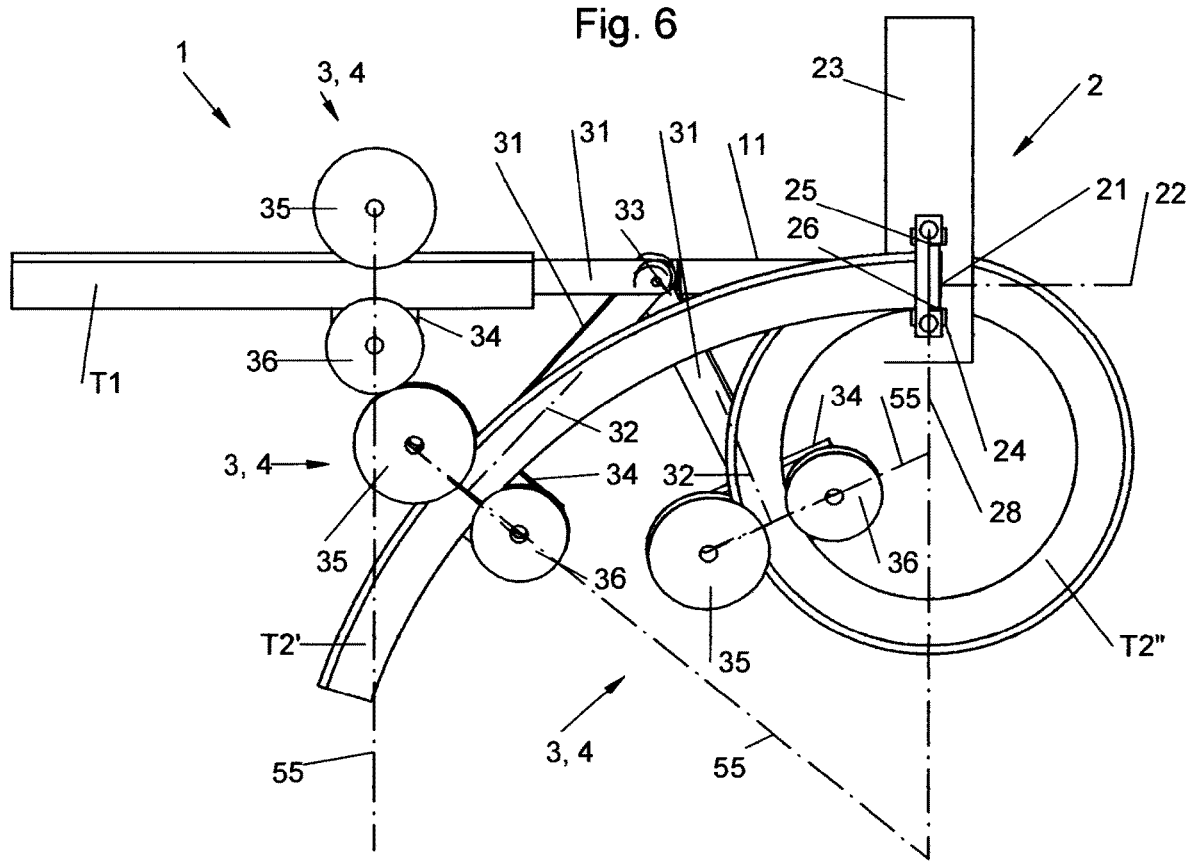

With reference to FIGS. 4, 5, it is possible to clarify the geometric operating principle. A pair of rectilinear segments coming out of a generic point P external to a circumference and tangent thereto in two points A1 and A2 has segments with the same length.

According to the geometric reconstruction, a sheaf of circumferences C1, C2, C3 (this latter one degenerate and coincident with a straight line) tangent to a single point A1 has the property according to which any rectilinear segment coming out of a generic point P whose length is the same as the length between point P and the commonly tangent point A1, is always tangent to any circumference of the sheaf C1, C2, C3 in the respective points A2, A3, A4 coincident with the other end of the rectilinear segment.

Figure 9:
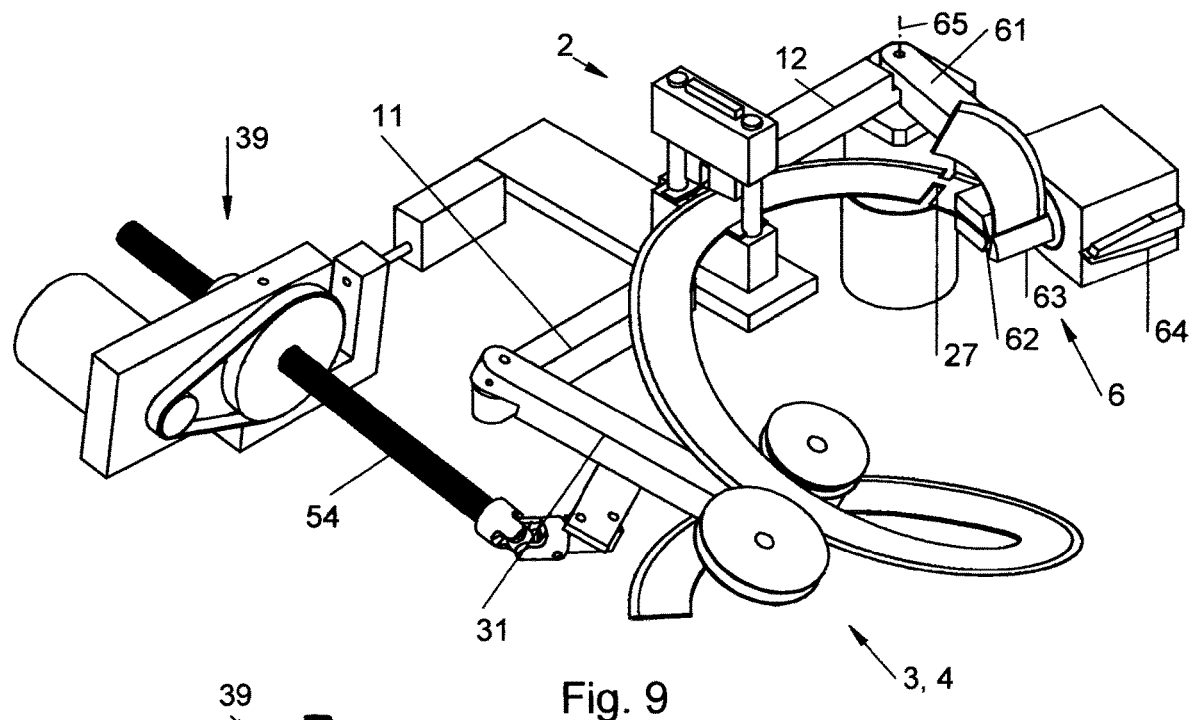
FIGS. 9 and 10 shows an axonometric view and a plan view of a second embodiment as an example of the machine for working ribbon-shaped elements according to the present invention.
Figure 10:
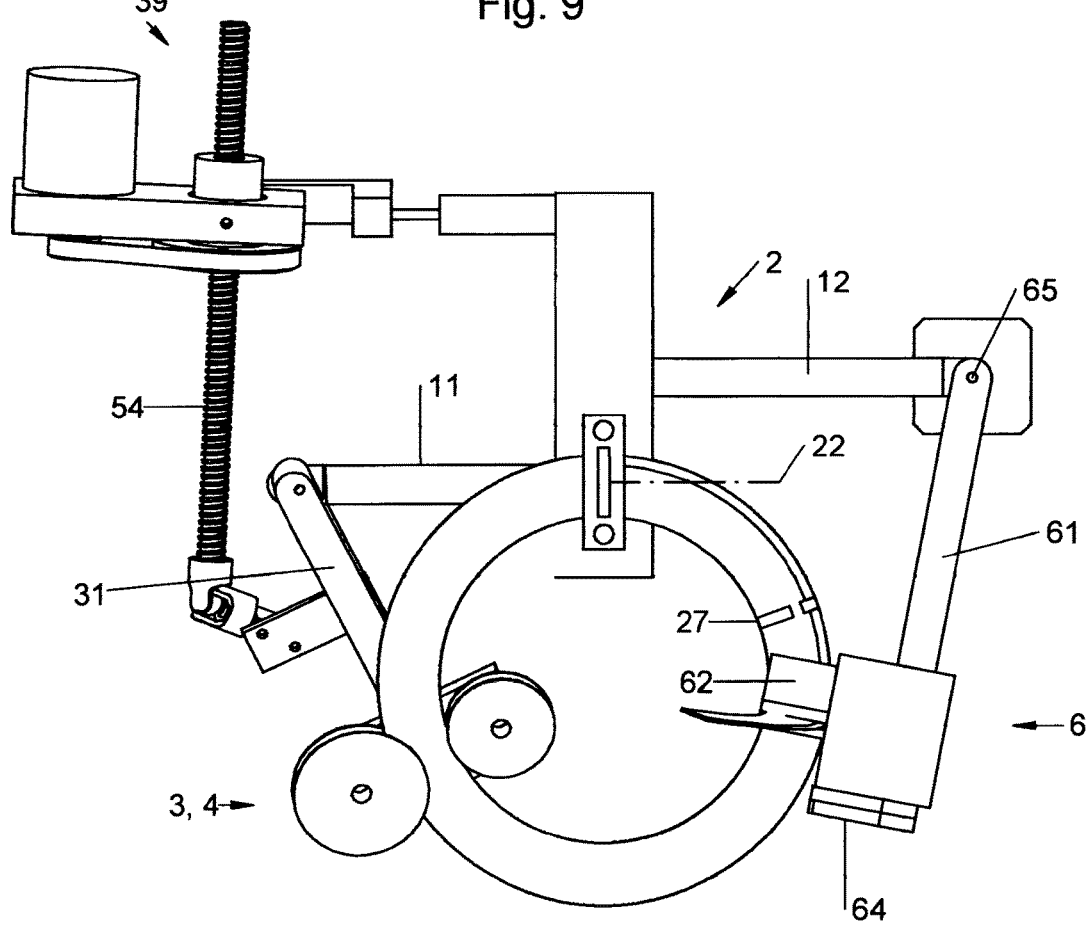

With reference to FIGS. 9, 10, at least one operating station 6 rests on an arm 61 free of rotating with respect to a fixed axis 65.

The fixed axis 65 is at the same distance with respect to the cutting station 2 and the operating station 6.

With reference to FIGS. 11 to 13, the ribbon-shaped element T2', T2" follows a helical trajectory with an increasing slant upon increasing the distance from the cutting station 2.

In order to better match the action of the guiding means 3, 4 and that of the operating station 6, a slanted joint allows the arm 31, 61 to change its own attitude depending on the helix radius of the ribbon-shaped element T2', T2", and therefore depending on the higher or smaller curvature with which the section of ribbon must be addressed and positioned on the plane P1.

The slanted joint adapted to connect the arm 31, 61 to an arm 11, 12 integral with the fixed structure of the machine 1 is composed of a pair of slanted surfaces.

Figure 8:
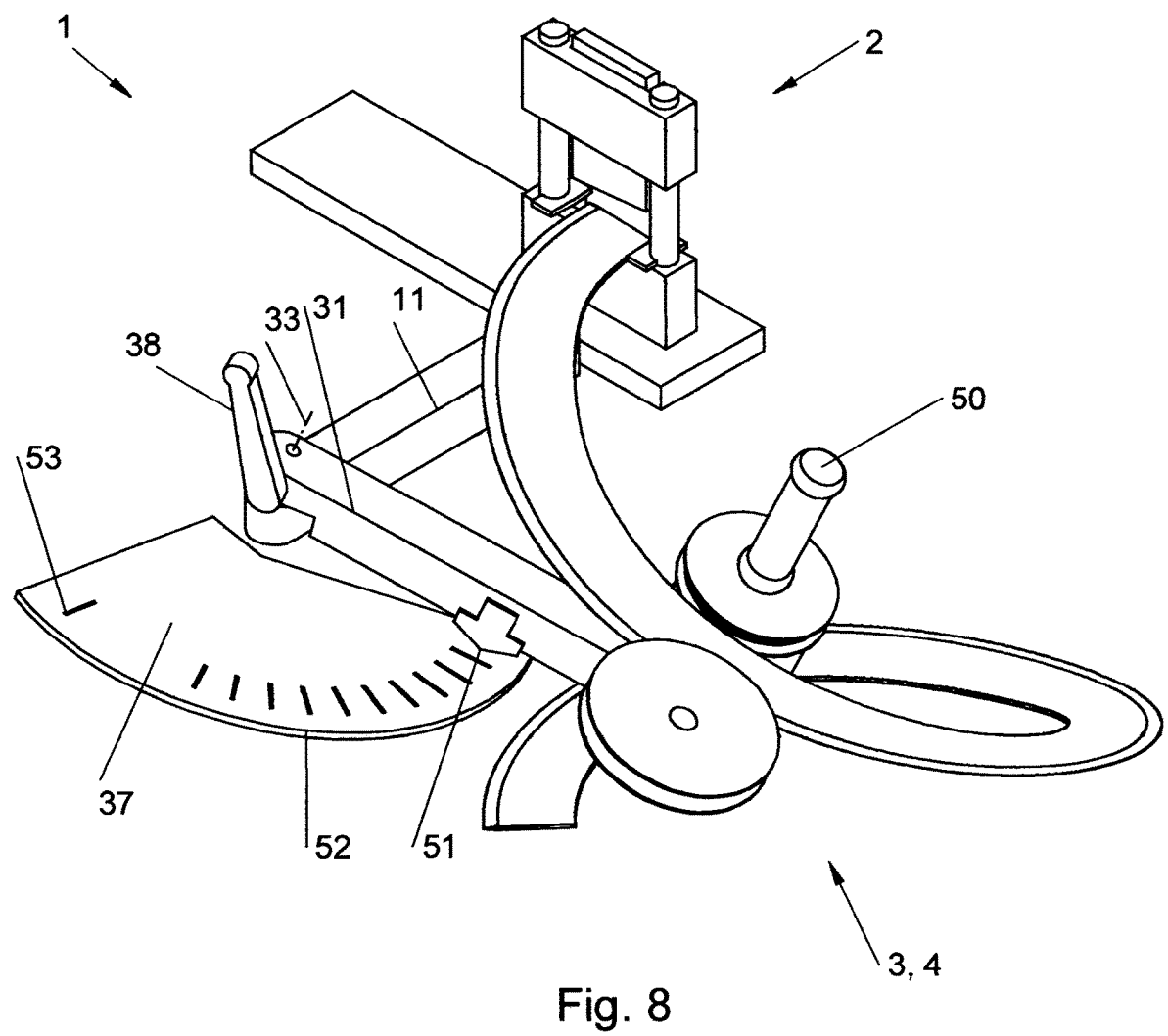
FIG. 8 shows an axonometric view of a first preferred embodiment as an example of the machine for working ribbon-shaped elements according to the present invention.

With reference to FIG. 8, the machine 1 comprises an indicating quadrant 37 adapted to check the angular rotation value of the arm 31 and a blocking device 38 adapted to stop and block the arm 31.

The indicating quadrant 37 can also be used to check the angular rotation value of the arm 61. The blocking device 38 can also be used to stop and block the arm 61.

With reference to FIGS. 9, 10, the machine 1 can comprise an actuator composed of a motored assembly 39, of the type coupled with a screw-scroll system 54, or directly connected along the fixed axis 33.

According to a preferred configuration of the machine 1, the operating station 6 is a folding station.

The invention claimed is:

1. A machine for working a ribbon-shaped element, comprising:
    an arm free to rotate with respect to a fixed axis of the machine;
    a cutting station fixed on the machine a distance from the fixed axis, the cutting station defining a fixed plane with a fixed point; and
    a guiding means fixed on the arm at the distance from the fixed axis, the guiding means adapted to position the ribbon-shaped element onto the fixed plane of the cutting station such that an edge of the ribbon-shaped element is tangent to the fixed point of the fixed plane.

2. The machine of claim 1, wherein the cutting station further comprises a pair of side guides on opposite sides of the fixed plane of the cutting station and configured to guide the ribbon-shaped element over the fixed plane, the side guides fixed on the machine such that a line between the side guides is perpendicular to a line between the fixed point and fixed axis.

3. The machine of claim 2, wherein the guiding means comprises contact elements on opposite sides of the guiding means adapted to drag the ribbon-shaped element therethrough to position the ribbon-shaped element onto the fixed plane.

4. The machine of claim 3, wherein the fixed axis is substantially perpendicular to the fixed plane and a distance between the fixed axis and a line between the side guides coincides with a distance between said fixed axis and a line between the contact elements.

5. The machine of claim 4, further comprising:
    a second arm free to rotate about a second fixed axis of the machine, the second fixed axis at a second distance from the cutting station, the second arm on an opposite side of the the cutting station with respect to the fixed axis;
    an operating station fixed on the second arm at the second distance from the second fixed axis.

6. The machine of claim 1, further compromising:
    an indicating quadrant positioned under a rotational plane of the arm and adapted to check an angular rotation value of the arm with respect to the fixed axis; and
    a blocking device fixed to the machine adjacent to the fixed axis and adapted to stop the arm, preventing further rotation.

7. The machine of claim 1, further comprising an actuator connected to the arm composed of a motored assembly, of a type coupled with a screw-scroll system, the actuator adapted to rotate the arm with respect to the fixed axis.

8. The machine of claim 5, wherein the operating station is a folding station.

* * * * *